(12) United States Patent
Warner et al.

(10) Patent No.: US 7,386,568 B2
(45) Date of Patent: Jun. 10, 2008

(54) TECHNIQUES FOR PARTIAL REWRITE OF XPATH QUERIES IN A RELATIONAL DATABASE

(75) Inventors: James W. Warner, Mountain View, CA (US); Zhen Hua Liu, San Mateo, CA (US); Muralidhar Krishnaprasad, Fremont, CA (US); Anand Manikutty, Foster City, CA (US); Rohan Angrish, Redwood City, CA (US); Vikas Arora, San Francisco, CA (US); Susan M. Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 580 days.

(21) Appl. No.: 10/984,471

(22) Filed: Nov. 8, 2004

(65) Prior Publication Data

US 2005/0065949 A1 Mar. 24, 2005

Related U.S. Application Data

(63) Continuation-in-part of application No. 10/428,878, filed on May 1, 2003, now Pat. No. 7,120,645.

(51) Int. Cl.
G06F 17/30 (2006.01)
(52) U.S. Cl. .................................... 707/102
(58) Field of Classification Search ............... 707/102
See application file for complete search history.

(56) References Cited

U.S. PATENT DOCUMENTS

| 6,836,778 | B2 | 12/2004 | Manikutty et al. |
| 7,031,956 | B1 | 4/2006 | Lee et al. |
| 2002/0073019 | A1 | 6/2002 | Deaton |
| 2002/0116457 | A1 | 8/2002 | Eshleman et al. |
| 2002/0123993 | A1* | 9/2002 | Chau et al. ............. 707/5 |
| 2003/0065659 | A1 | 4/2003 | Agarwal et al. |
| 2003/0120651 | A1* | 6/2003 | Bernstein et al. ........... 707/6 |
| 2003/0140308 | A1 | 7/2003 | Murthy et al. |

(Continued)

OTHER PUBLICATIONS

Josephine Cheng, et al., "IBM DB2 XML Extender, An end-to-end solution for storing and retrieving XML documents," IEEE, ICDE '00 Conference, San Diego, Feb. 2000, 128 pages.

(Continued)

*Primary Examiner*—Diane Mizrahi
(74) *Attorney, Agent, or Firm*—Hickman Palermo Truong & Becker LLP

(57) ABSTRACT

Techniques are described for executing queries that have XPath sections that specify unmappable paths. The techniques involve splitting the unmappable paths into (1) a mappable path fragment, and (2) an unmappable path fragment. After an unmappable path has been split into a mappable path fragment and an unmappable path fragment, the XPath section is replaced with a replacement XPath section. The replacement XPath section specifies two operations: a "mappable operation" that is based on the mappable path fragment, and an "unmappable operation" that is based on the unmappable path fragment. The portion of the replacement XPath section that specifies the mappable operation is rewritten to access underlying relational structures. Consequently, when the rewritten query is executed, a smaller amount of XML data needs to be materialized to evaluate the unmappable path fragment than would otherwise have been required to evaluate the original unmappable path.

21 Claims, 2 Drawing Sheets

U.S. PATENT DOCUMENTS

| | | | |
|---|---|---|---|
| 2004/0088415 | A1 | 5/2004 | Chandrasekar et al. |
| 2004/0148278 | A1 | 7/2004 | Milo et al. |
| 2004/0220912 | A1 | 11/2004 | Manikutty et al. |
| 2004/0220927 | A1 | 11/2004 | Murthy et al. |
| 2004/0267760 | A1 | 12/2004 | Brundage et al. |
| 2005/0010896 | A1 | 1/2005 | Meliksetian et al. |
| 2005/0044113 | A1* | 2/2005 | Manikutty et al. ....... 707/104.1 |
| 2005/0289125 | A1 | 12/2005 | Liu et al. |

OTHER PUBLICATIONS

Jim Melton, "ISO-ANSI Working Draft, XML-Related Specifications (SQL/XML)," WG3: DRS-020, H2-2002-365, Aug. 2002, 154 pages.

Oracle Corporation, "Oracle9*i* XML Database Developer's Guide—Oracle XML DB," Release 2 (9.2), Mar. 2002, Part No. A96620-1, pp. 5-8-5-10, 5-21-5-24, 5-52-5-70, 10-5-10-20 and 11-1-11-20.

W3C, "XML Schema Part 1: Structures," W3C Recommendation, May 2, 2001, http://www.w3.org/TR/2001/REC-xmlschema-1-20010502/, pp. 1-203 (text provided on CD-ROM).

W3C, "XML Schema Part 2: Datatypes," W3C Recommendation, May 2, 2001, http://www.w3.org/TR/2001/REC-xmlschema-2-20010502/, pp. 1-146 (text provided on CD-ROM).

Peng, Feng et al., "XPath queries on streaming data", 2003, ACM Press, pp. 431-442.

Vion-Dury, Jean-Yves, "XPath on left and right sides of rules: toward compact XML tree rewriting through node patterns", 2003, ACM Press, pp. 19-25.

* cited by examiner

TECHNIQUES FOR PARTIAL REWRITE OF XPATH QUERIES IN A RELATIONAL DATABASE

CLAIM OF PRIORITY

This application is a continuation-in-part of, and claims priority to, U.S. patent application Ser. No. 10/428,878, entitled TECHNIQUES FOR REWRITING XML QUERIES DIRECTED TO RELATIONAL DATABASE CONSTRUCTS, filed by ANAND MANIKUTTY, et al. on May 1, 2003, now U.S. Pat. No. 7,120,645 referred to hereafter as the "Rewrite Application", the contents of which are herein incorporated by reference as if originally set forth herein.

FIELD OF THE INVENTION

The present invention relates to processing queries and, more specifically, to techniques for partially rewriting XPath queries.

BACKGROUND OF THE INVENTION

The Extensible Markup Language (XML) is an increasingly popular standard for data and documents that is finding wide acceptance in the computer industry. Customers want to expose data as XML to work with XML tools and applications. However, a significant fraction of enterprise data resides in relational and object-relational databases, which are queried using the Structured Query Language (SQL). This data is typically, but not limited to, legacy data that has been stored and maintained over years, or even decades, using the relational data model.

There have been proposals on XML Generation, specifying how relational or object-relational data can be flexibly mapped to XML (see material at www.sqlx.org), and XML Querying, flexibly expressing queries over the underlying relational or object-relational data, in the SQL environment. However, storing and retrieving the data en bloc is not enough.

It is important to be able to efficiently execute queries over the relational and object-relational data using XML query languages. XPath is an important query language, which can be used in conjunction with SQL to express a large variety of useful queries.

Various approaches have been developed for executing XPath queries over relational and object-relational data exposed as XML. One approach for executing XPath queries over relational and object-relational data exposed as XML is referred to herein as the "dynamic-materialization" approach. According to the dynamic-materialization approach, the XML is materialized (e.g. as a DOM) from the relational/object-relational data in response to receiving an XPath query, and then the XPath query is executed over the dynamically-materialized XML. Unfortunately, materializing the entire XML document is extremely expensive, and it involves the use of large amounts of additional memory, CPU cycles, disk space (swap space) and other resources.

Another approach for executing XPath queries over relational and object-relational data exposed as XML is referred to herein as the "migration" approach. The migration approach involves migrating such data into (1) a different native XML database, or (2) XML-specific structures within a relational database. For example, once converted, the XML data may be stored in schema-based or non-schema-based XMLType tables. However, the migration approach involves data migration, which is expensive and often not feasible, since customers are not open to migrating systems with legacy data from several years.

Another approach for executing XPath queries over relational and object-relational data exposed as XML is referred to herein as the "middle-tier" approach. The middle-tier approach involves fetching the objects and relational data into a middle-tier layer, such as an application server, and performing XML manipulation there. Because the middle tier approach involves performing sophisticated XML manipulation outside of the database system, an inefficiently large amount of data may need to be fetched into the middle-tier.

Another approach for executing XPath queries over relational and object-relational data exposed as XML is referred to herein as the "rewrite" approach. According to the rewrite approach, XMLType views are used to make object-relational data available as XML. XPath queries that access schema-based and non-schema-based XMLType views are then dynamically rewritten to go directly over the underlying object-relational data. Since the entire XML does not need to manifested, and instead the query is rewritten to go directly on relational data, efficient access of the relational data can lead to orders of magnitude performance gains over previous approaches. Specific techniques for implementing the rewrite approach are described in the Rewrite Application, referred to above.

Specifically, the Rewrite Application describes a query rewrite system that takes as input (1) the XPath query being rewritten, and (2) the XMLType view or subquery over which the XPath query is being executed. Based on these inputs, the rewrite system rewrites the XPath query to directly access the underlying relational structures that contain the data exposed through the XMLType views.

For example, an XMLType view may be defined as follows:

```
create type emp_t as object (
    EMPNO NUMBER(4), ename VARCHAR2(10), job VARCHAR2(9), mgr NUMBER(4),
      HIREDATE DATE);
create type emp_list is varray(100) of emp_t;
create or replace type dept_t as object (
"@DEPTNO" NUMBER(2), DeptNAME VARCHAR2(14), LOC VARCHAR2(13),
    employees emp_list);
create view dept_ov of dept_t with object id (deptname) as
    select deptno, dname, loc, CAST(MULTISET(
      select emp_t(empno, ename, job, mgr, hiredate)
      from emp e where e.deptno = d.deptno) AS emp_list)
    from dept d;
create view dept_xv of xmltype
```

-continued

```
with object id(SYS_NC_ROWINFO$.extract('/ROW/@DEPTNO').getnumberval( )) as
   select SYS_XMLGEN(VALUE(p)) FROM dept_ov p ;
```

Based on this XMLtype view definition, the query rewrite rules described in the Rewrite Application may be used to rewrite the following XPath-based query (Q1):

```
SELECT   extractvalue(value(p),'/ROW/DEPTNAME')   DEPARTMENTNAME   from
dept_xv p where extract(value(p), '/ROW/@DEPTNO') = 2134;
``` into the following SQL query (Q2):

```
SELECT   SYS_ALIAS_1.DNAME   "DEPARTMENTNAME"   FROM   DEPT
SYS_ALIAS_1 WHERE SYS_ALIAS_1.DNO =2134;
```

In this example, two separate sections of Q1 specify XPath operations. Specifically, "extractvalue(value(p),'/ROW/DEPTNAME')" specifies one XPath operation, and "extract(value(p), '/ROW/@DEPTNO')" specifies another XPath operation. Sections of a query that specify an XPath operation shall be referred to herein as "XPath sections".

Each XPath section uses an XPath string to identify the XML data upon which an operation is to be performed. For example, in Q1, the XPath string for XPath section "extractvalue(value(p),'/ROW/DEPTNAME')" is "/ROW/DEPTNAME". The XPath string for the XPath section "extract(value(p), '/ROW/@DEPTNO'" is "/ROW/@DEPTNO'".

In the example given above, all XPath sections of Q1 have been rewritten in Q2 so that Q2 includes no XPath sections. Specifically, the XPath section "extractvalue(value(p), '/ROW/DEPTNAME')" of Q1 was rewritten as "SYS_ALIAS_1.DNAME" in Q2. Similarly, the XPath section "extract(value(p), '/ROW/@DEPTNO')" of Q1 was rewritten as "SYS_ALIAS_1.DNO" in Q2.

The overhead of rewriting an XPath query is incurred once per query, not once per row, since these operations are performed at compile-time. Consequently, the rewrite approach is highly efficient for XPath queries whose XPath sections can, in fact, be rewritten.

Unfortunately, not all XPath sections can be rewritten in this fashion. An XPath section may be non-rewritable for a variety of reasons. Some XPath sections are not rewritable, for example, because the XPath string contains a node that does not map to a column in an object-relational construct. In order to be "mappable," the full structure needs to be known at compile time. The full structure may not be known at compile time because of the specific storage used, because of the XML schema, because of the XPath, or because of the XML is generated from an arbitrary function. For example, if the target of an XPath string is an element of a parent that is stored as a LOB, then the XML section cannot be entirely replaced by an SQL operation that produces the same result. An XPath string that cannot be fully mapped to a corresponding relational structure is referred to herein as an "unmappable path".

If an XPath section specifies an unmappable path, then the XPath section is not rewritten, and the dynamic-materialization approach is used to evaluate the XPath operation specified in the XPath section. Specifically, the XML is manifested in memory (e.g. as a DOM) and the XPath is evaluated over the DOM. Unfortunately, the performance of the dynamic-materialization approach is often unacceptable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described hereafter for executing queries that have XPath sections that specify unmappable paths. The techniques involve splitting the unmappable paths into (1) a mappable path fragment, and (2) an unmappable path fragment. After an unmappable path has been split into a mappable path fragment and an unmappable path fragment, the XPath section is replaced with a replacement XPath section.

The replacement XPath section specifies two operations which, when executed, produce the same result as the XPath operation they replace. The two replacement operations includes a "mappable operation" that is based on the mappable path fragment, and an "unmappable operation" that is based on the unmappable path fragment. The portion of the replacement XPath section that specifies the mappable operation is referred to herein as the "rewritable portion" of the replacement XPath section.

During query rewrite, the rewritable portion of the replacement XPath section is rewritten to create a "rewritten section" that accesses the appropriate underlying relational structures. Consequently, when the rewritten query is executed, the mappable operation is performed by executing SQL against the underlying relational structures. In contrast, the unmappable operation is evaluated, for example, using the dynamic-materialization approach. However, because the unmappable path fragment specifies a much smaller portion of the XML document than the unmappable path of the original query, the dynamic-materialization required by the unmappable operation involves much fewer resources than would have been required if the original XPath section had not been replaced.

Operational Overview

Figure 1:
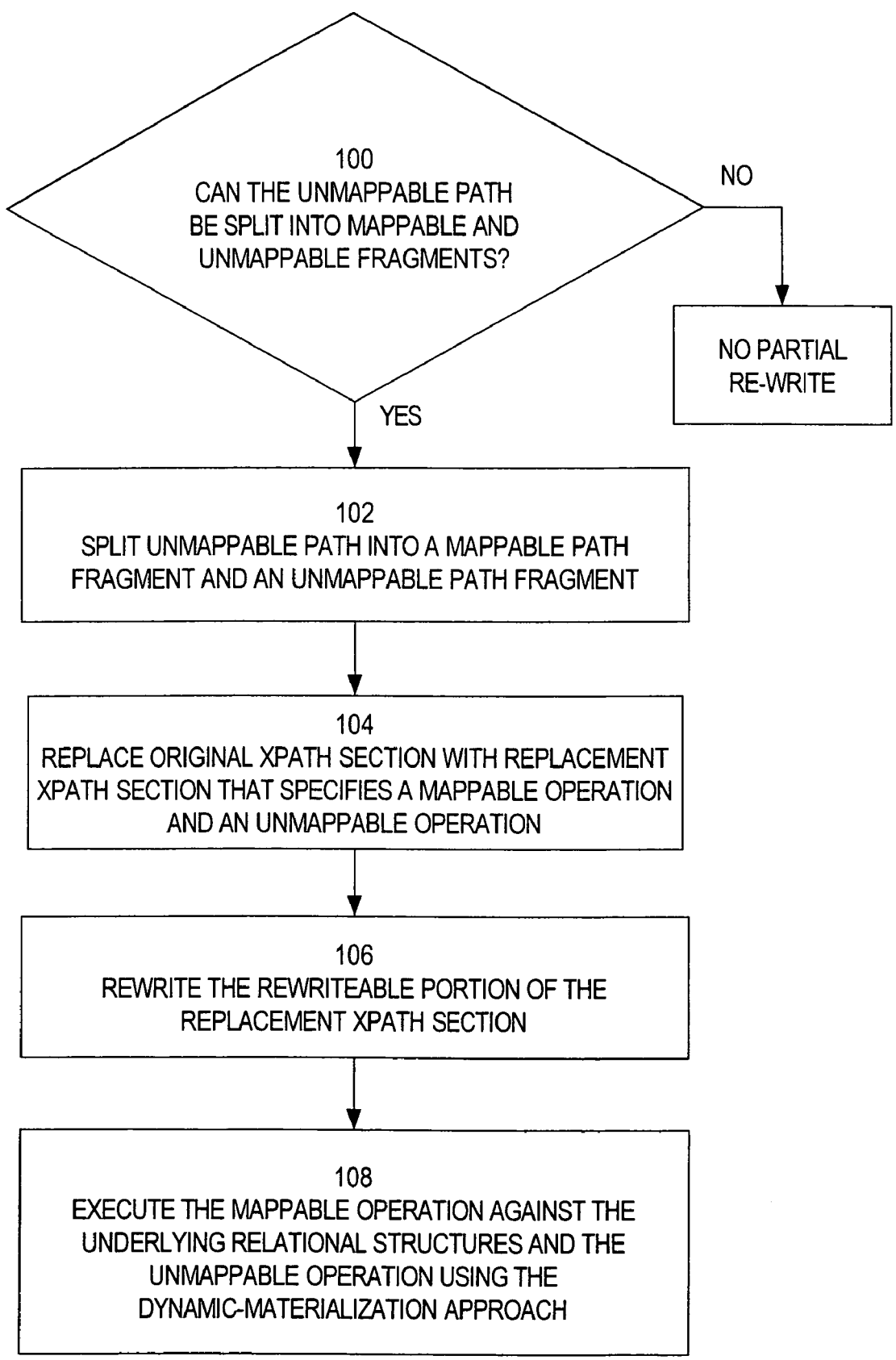
FIG. 1 is a flowchart showing steps for processing a query that includes an XPath Section with an unmappable path, according to an embodiment of the invention.

FIG. 1 is a flowchart that illustrates steps for processing a query that contains an XPath section with an unmappable path, according to an embodiment of the invention. Referring to FIG. 1, at step 100, it is determined whether the unmappable path can be split into a mappable path fragment and an unmappable path fragment. If the unmappable path can be split into a mappable path fragment and an unmappable path fragment, then control proceeds to step 102. If the unmappable path cannot be split into a mappable path fragment and an unmappable path fragment, no partial rewrite is performed.

At step 102 the database server splits the unmappable path of the query into a mappable path fragment and an unmappable path fragment. At step 104, the original XPath section is replaced with a replacement XPath section that specifies a mappable operation (based on the mappable path fragment) and an unmappable operation (based on the unmappable path fragment). At step 106, the rewritable portion of the replacement XPath section is rewritten to directly access the underlying relational constructs.

At step 108, the rewritten query is executed. During execution of the rewritten query, the mappable operation is performed against the underlying relational structures, and the unmappable operation is performed using the dynamic-materialization approach.

Each of these steps shall be described in greater detail hereafter.

Determining Whether the Unmappable Path can be Split

When a database server receives a query that includes an XPath section with an unmappable path, the database server determines whether the unmappable path can be split into a mappable path fragment and an unmappable path fragment (step 100 of FIG. 1).

There are various reasons why an unmappable path cannot be split in this fashion. The reasons why a partial rewrite may not be possible varies based on the specifics of the system. For example, in some systems, a path cannot be split if a later element in the path refers to an earlier element in the path, or requires ascending back up the path. More specifically, such splitting may not be possible if the path:
is part of an extract.getnumberval() query, since the proper type cannot be determined;
has an unmappable element as the first node in the XPath; points to a collection element; or
has a reference to an ancestor, ancestor-or-self, preceding, preceding-sibling, parent, following, or following-sibling axis at any level beneath the unrewritable node.

Splitting the Unmappable Path

If the unmappable path can be split into a mappable path fragment and an unmappable path fragment, then the unmappable path is split into a mappable path fragment and an unmappable path fragment, as illustrated in step 102 of FIG. 1. It should be noted that the mappable and unmappable path fragments are themselves paths. Therefore, the process of splitting paths into path fragments may be performed recursively, such that the splitting operations may result in any number of distinct path fragments. For the purpose of explanation, examples are given in which an unmappable path is split into two fragments. However, the split operation may actually result in more than two fragments. For example, an XPath might be splittable into two mappable paths and one unmappable path. The operations performed on the path fragments may be combined using unions, predicates, etc.

For the purpose of explanation, it shall be assumed that the database server receives the following query (Q3):

--- select extractvalue (x, '/Employee/Dept/DeptNo')
 from MYEMP x;

---

In query Q3, "extractvalue(x, '/Employee/Dept/DeptNo')" is the XPath section of the original query, and "/Employee/Dept/DeptNo" is the XPath string of the XPath section.

For the purpose of explanation, it shall be assumed that the Dept structure cannot be rewritten. For example, the Dept structure may be stored in a LOB. Under these circumstances, the XPath string "/Employee/Dept/DeptNo" is unmappable because the target of the XPath string is an attribute stored within a LOB.

Under these circumstances, step 102 may be performed by splitting the unmappable path "/Employee/Dept/DeptNo" into the mappable path fragment "/Employee/Dept" and the unmappable path fragment "/Dept/DeptNo".

Replacing the Original Xpath Section

After the unmappable path is split in step 102, the original XPath section is replaced (at step 104) with a replacement XPath section that specifies a mappable operation (based on the mappable path fragment) and an unmappable operation (based on the unmappable path fragment). In the present example, the original XPath section "extractvalue(x, '/Employee/Dept/DeptNo')" may be replaced with the replacement section "extractvalue(extract(x, '/Employee/Dept'), '/Dept/DeptNo')". After the replacement is made, the query appears as follows (Q4):

--- select extractvalue (extract (x, '/Employee/Dept'), '/Dept/DeptNo')
 from MYEMP x;

---

The replacement section specifies both an extract() operation and an extractvalue() operation. The extract() operation is mappable because its target is specified by the mappable path fragment. The extractvalue() operation is unmappable because its target is specified by the unmappable path fragment. Because the extract() operation is mappable, the portion of the query that is associated with the extract() operation (i.e. "extract(x, '/Employee/Dept')") is the rewritable portion of the replacement section.

Rewriting the Rewritable Portion Fo the Replacement Section

After the original XPath section is replaced (at step 104) with a replacement XPath section, the rewritable portion of the replacement XPath section is rewritten (at step 106). The rewritable portion can be rewritten over either structured schema-based storage or over SQL/XML views. In the present example, rewriting query Q4 may result in the following query (Q5):

---
select extractvalue (SYS_ALIAS_1.DNO, '/Dept/DeptNo')
from MYEMP x;

---

In the rewritten query Q5, the rewritable portion "extract(x, '/Employee/Dept')" of Q4 has been rewritten as "SYS_ALIAS_1.DNO", which refers directly to the underlying relational structures. According to one embodiment, step 104 is performed using the techniques described in the Rewrite Application.

Executing the Rewritten Query

At step 108, the rewritten query is executed. During execution of the rewritten query, the mappable operation (e.g. the extract() operation) is performed against the underlying relational structures (SYS_ALIAS_1.DNO), and the unmappable operation (e.g. the extractvalue() operation) is performed using the dynamic-materialization approach. In the rewritten query, the path for the extractvalue() operation is '/Dept/DeptNo'. Materializing the XML data associated with this path requires significantly less resources than would have been required to materialize the XML data associated with the XPath "'/Employee/Dept/DeptNo'" specified in the original query (Q3).

Hardware Overview

Figure 2:
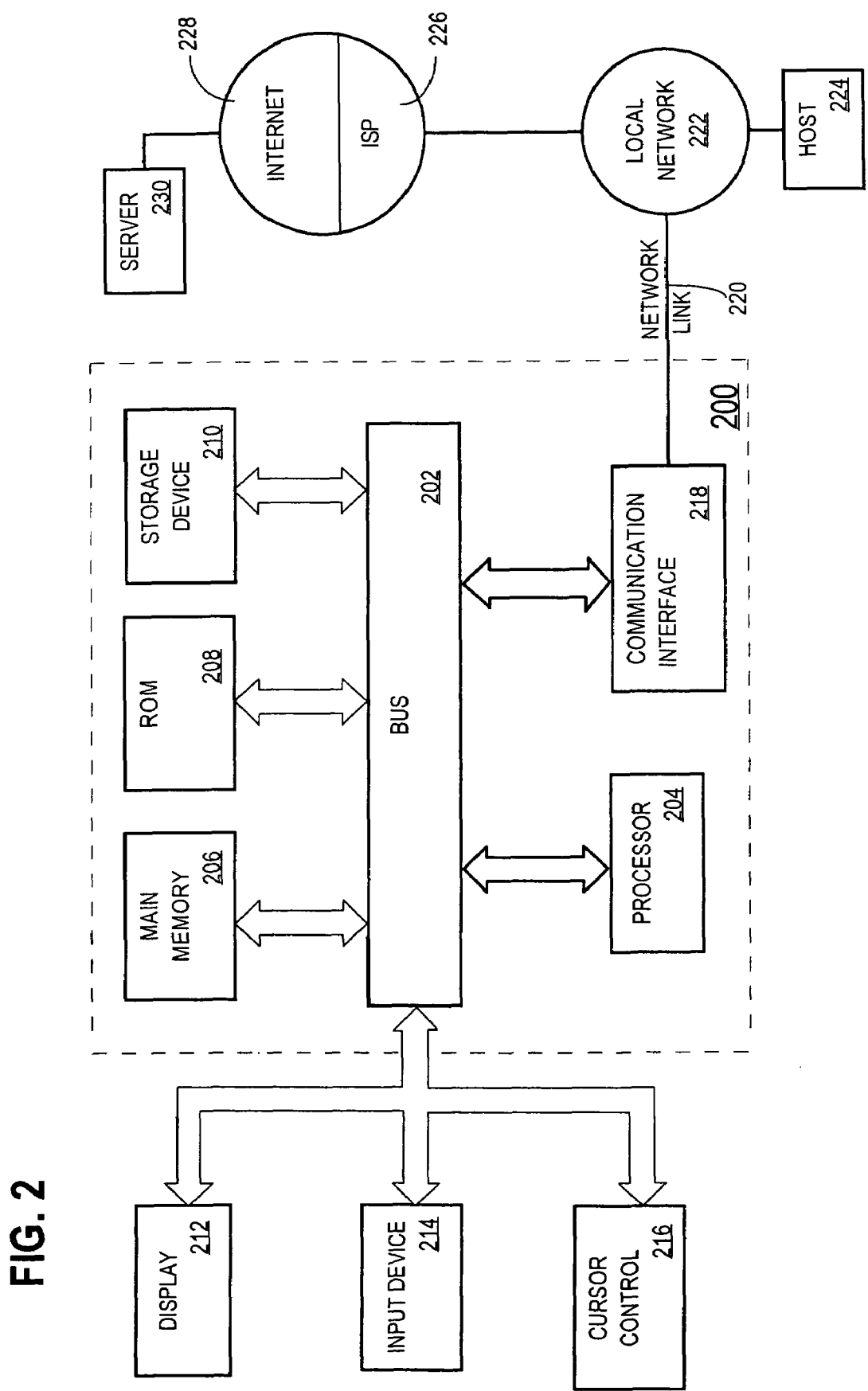
FIG. 2 is a block diagram illustrating a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing a database command that includes section that specifies an operation to be performed on an unmappable path, which when executed by a computer causes the computer to perform the method which comprises the steps of:
   splitting the unmappable path into a plurality of path fragments, wherein the plurality of path fragments includes a mappable path fragment and an unmappable path fragment; and
   replacing the section with a replacement section that specifies operations involving path fragments from the plurality of path fragments, wherein the operations include:
   a mappable operation whose target is defined by the mappable path fragment; and
   an unmappable operation whose target is defined by the unmappable path fragment.

2. The method of claim 1 wherein:
   the section is an XPath section; and
   the step of replacing the section with a replacement section that specifies operations involving path fragments from the plurality of path fragments, includes replacing the XPath section with a replacement XPath section that specifies operations involving path fragments from the plurality of path fragments.

3. The method of claim 2 wherein:
   the mappable operation is defined by a particular portion of the replacement XPath section; and
   the method further comprises the step of rewriting the particular portion prior to executing the database command.

4. The method of claim 3 wherein the step of rewriting the particular portion includes rewriting the particular portion over structured schema-based storage.

5. A computer-readable storage medium storing one or more sequences of instructions which, when executed by one or more processors, causes the one or more processors to perform the method recited in claim 4.

6. The method of claim 3 wherein the step of rewriting the particular portion includes rewriting the particular portion over one or more SQL/XML views.

7. A computer-readable storage medium storing one or more sequences of instructions which, when executed by one or more processors, causes the one or more processors to perform the method recited in claim 6.

8. The method of claim 3 wherein the step of rewriting the particular portion includes rewriting the particular portion over one or more object views.

9. A computer-readable storage medium storing one or more sequences of instructions which, when executed by one or more processors, causes the one or more processors to perform the method recited in claim 8.

10. The method of claim 3 wherein the step of rewriting the particular portion includes rewriting the particular portion over a combination of two or more storage types from a set of storage types that consists of object views, SQL/XML views, and structured schema-based storage.

11. A computer-readable storage medium storing one or more sequences of instructions which, when executed by one or more processors, causes the one or more processors to perform the method recited in claim 10.

12. A computer-readable storage medium storing one or more sequences of instructions which, when executed by one or more processors, causes the one or more processors to perform the method recited in claim 3.

13. The method of claim 2 wherein the method further includes determining that the unmappable path can be split into mappable and unmappable fragments prior to splitting the unmappable path into a mappable path fragment and an unmappable path fragment.

14. The method of claim 13 wherein the step of determining that the unmappable path can be split into mappable and unmappable fragments includes determining that the unmappable path does not have an unmappable element as the first node in the unmappable path.

15. A computer-readable storage medium storing one or more sequences of instructions which, when executed by one or more processors, causes the one or more processors to perform the method recited in claim 14.

16. The method of claim 13 wherein the step of determining that the unmappable path can be split into mappable and unmappable fragments includes determining that the unmappable path does not point to a collection element.

17. A computer-readable storage medium storing one or more sequences of instructions which, when executed by one or more processors, causes the one or more processors to perform the method recited in claim 16.

18. The method of claim 13 wherein the step of determining that the unmappable path can be split into mappable and unmappable fragments includes determining that the unmappable path does not have a reference to an ancestor, ancestor-or-self, preceding, preceding-sibling, parent, following, or following-sibling axis at any level beneath an unrewritable node.

19. A computer-readable storage medium storing one or more sequences of instructions which, when executed by one or more processors, causes the one or more processors to perform the method recited in claim 18.

20. A computer-readable storage medium storing one or more sequences of instructions which, when executed by one or more processors, causes the one or more processors to perform the method recited in claim 13.

21. A computer-readable storage medium storing one or more sequences of instructions which, when executed by one or more processors, causes the one or more processors to perform the method recited in claim 1.

* * * * *

UNITED STATES PATENT AND TRADEMARK OFFICE
CERTIFICATE OF CORRECTION

PATENT NO.       : 7,386,568 B2
APPLICATION NO.  : 10/984471
DATED            : June 10, 2008
INVENTOR(S)      : Warner et al.

Page 1 of 1

It is certified that error appears in the above-identified patent and that said Letters Patent is hereby corrected as shown below:

In column 3, line 38, delete ""/ROW/@DEPTNO""" and insert -- '/ROW/@DEPTNO')" --, therefor.

In column 3, line 39, delete "@DEPTNO"'." and insert -- @DEPTNO". --, therefor.

In column 5, line 4, delete "includes" and insert -- include --, therefor.

In column 6, line 50, delete "Xpath" and insert -- XPath --, therefor.

In column 7, line 11, delete "Fo" and insert -- of --, therefor.

Signed and Sealed this

Seventh Day of July, 2009

JOHN DOLL
*Acting Director of the United States Patent and Trademark Office*